United States Patent
Mestenhauser

(10) Patent No.: US 12,498,296 B2
(45) Date of Patent: Dec. 16, 2025

(54) FLAT BELT TESTER WITH MOVING ENDLESS SUPPORT MEMBER

(71) Applicant: MTS Systems Corporation, Eden Prairie, MN (US)

(72) Inventor: Zdenek Mestenhauser, Minneapolis, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 240 days.

(21) Appl. No.: 18/135,554

(22) Filed: Apr. 17, 2023

(65) Prior Publication Data

US 2023/0341295 A1 Oct. 26, 2023

Related U.S. Application Data

(60) Provisional application No. 63/334,380, filed on Apr. 25, 2022.

(51) Int. Cl.
*G01M 17/007* (2006.01)

(52) U.S. Cl.
CPC ................ *G01M 17/007* (2013.01)

(58) Field of Classification Search
CPC ........... G01M 17/007; G01M 17/0074; G01M 17/022; G01M 17/021
See application file for complete search history.

(56) References Cited

U.S. PATENT DOCUMENTS

| | | | |
|---|---|---|---|
| 3,886,788 A | 6/1975 | Jeter, Jr. | |
| 3,914,990 A | 10/1975 | Borg | |
| 2008/0087104 A1* | 4/2008 | Matsumoto | G01M 17/0072 73/862.55 |

FOREIGN PATENT DOCUMENTS

| | | | | |
|---|---|---|---|---|
| AU | 2010200824 A1 | * | 2/2011 | ............ B65G 15/42 |
| DE | 3914309 C1 | | 10/1990 | |
| DE | 10131069 A1 | | 1/2003 | |
| DE | 102005031446 B4 | | 5/2007 | |
| EP | 0962757 A2 | | 2/2000 | |
| EP | 1884759 A1 | | 2/2008 | |
| WO | 199626422 A1 | | 8/1996 | |
| WO | 2006051347 A1 | | 5/2006 | |
| WO | 2009104697 A1 | | 8/2009 | |

OTHER PUBLICATIONS

Search Report in corresponding European patent application No. 23169065.2 dated Oct. 2, 2023.

* cited by examiner

*Primary Examiner* — Timothy P Graves
(74) *Attorney, Agent, or Firm* — Steven M. Koehler; Westman, Champlin & Koehler, P.A.

(57) ABSTRACT

A testing machine for rotating test specimens includes a frame and a roadway assembly. The roadway assembly includes an endless belt that provides a surface for engaging the test specimen and is supported by and rolls on rollers. An endless support member supported by the frame is disposed between the rollers and engages the endless belt from below. The endless support member moves with or is synchronized so as to have a velocity the same as the endless belt. The endless support member provides a flat reaction structure for loads from the test specimen placed on the endless belt and is of size corresponding to that needed by the contact patch of the test specimen upon the endless belt. Since the endless support member moves at the same velocity as the endless belt no forces are generated between the endless support member and the endless belt.

21 Claims, 3 Drawing Sheets

FLAT BELT TESTER WITH MOVING ENDLESS SUPPORT MEMBER

BACKGROUND

The discussion below is merely provided for general background information and is not intended to be used as an aid in determining the scope of the claimed subject matter.

Testing machines having an endless belt to simulate a roadway surface are known and are used for testing various tire and wheel assemblies. The testing machine includes a frame for supporting the test specimen on the endless belt. The endless belt is supported on and rotates about a pair of drums or rollers, one of which is typically driven. A center support positioned between the drums and below the endless belt is on a side opposite the test specimen and provides a reaction structure to maintain the belt flat since the belt is flexible. Commonly, the upper surface of the center support includes an oil lubricant that reacts the loads placed upon the belt from the test specimen using hydrodynamic principles. Although well suited for testing tire and wheels and assemblies at highway speeds, the testing machine is not suitable for all test specimens.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A first disclosed aspect is a testing machine for testing test specimens that rotate. The testing machine includes a frame and a roadway assembly. The roadway assembly includes a first roller and a second roller each joined to the frame. An endless belt provides a surface for engaging the test specimen and is supported by and rolls on the first roller and the second roller. An endless support member supported by the frame is disposed between the first and second rollers and engages the endless belt from below. The endless support member moves with or is synchronized so as to have a velocity the same as the endless belt. The endless support member provides a flat reaction structure for loads from the test specimen placed on the endless belt and is of size corresponding to that needed by the contact patch of the test specimen upon the endless belt. Since the endless support member moves at the same velocity as the endless belt no forces are generated between the endless support member and the endless belt.

The test machine may include one or more of the following features. The endless support member may include a first rotatable member and a second rotatable member so as to support the endless support member for rotation. A first drive typically is coupled to at least the first rotatable member to drive the first rotatable member. The testing machine commonly includes a second drive operably coupled to the first roller to drive the first roller and thus the endless belt. A controller is operably coupled to the first drive such that a velocity of the endless support member matches a velocity of the endless belt. Suitable speed sensors provide input signals corresponding to the speeds of the endless belt and endless support member.

A stationary support can be disposed between the first roller and the second roller. The stationary support supports the endless support member if necessary from below. A bearing can be disposed between the stationary support and a surface of the endless support member facing the stationary support so as to reduce friction. The bearing may include a plurality of rotatable support elements such as rollers extending transversely to the direction of movement of the endless support member. The bearing can also comprise a fluid disposed between the endless support member and the stationary support. The stationary support may include a plurality of outlets fluidly coupled to a source of pressurized fluid so as to emit the fluid upon the endless support member. The fluid may include a liquid or a gas. The source of pressurized gas may include a pump.

The endless support member may include a plurality of interconnected elements. In one embodiment, the interconnected elements may include interconnected plates. The interconnected elements may include interconnected plates, each plate extending in a direction transverse to a direction of movement of the endless belt.

Another general aspect includes a method of supporting a test specimen for rotation. The method also includes supporting the test specimen with an endless belt rotating below the test specimen; and supporting the endless belt with an endless support member on a side of the endless belt opposite the side engaging the test specimen, where a velocity of the endless support member below the test specimen matches a velocity of the endless belt below the test specimen. The foregoing features described above for the endless support member can be incorporated so as to support the test specimen during rotation.

DETAILED DESCRIPTION OF THE ILLUSTRATIVE EMBODIMENTS

Figure 1:
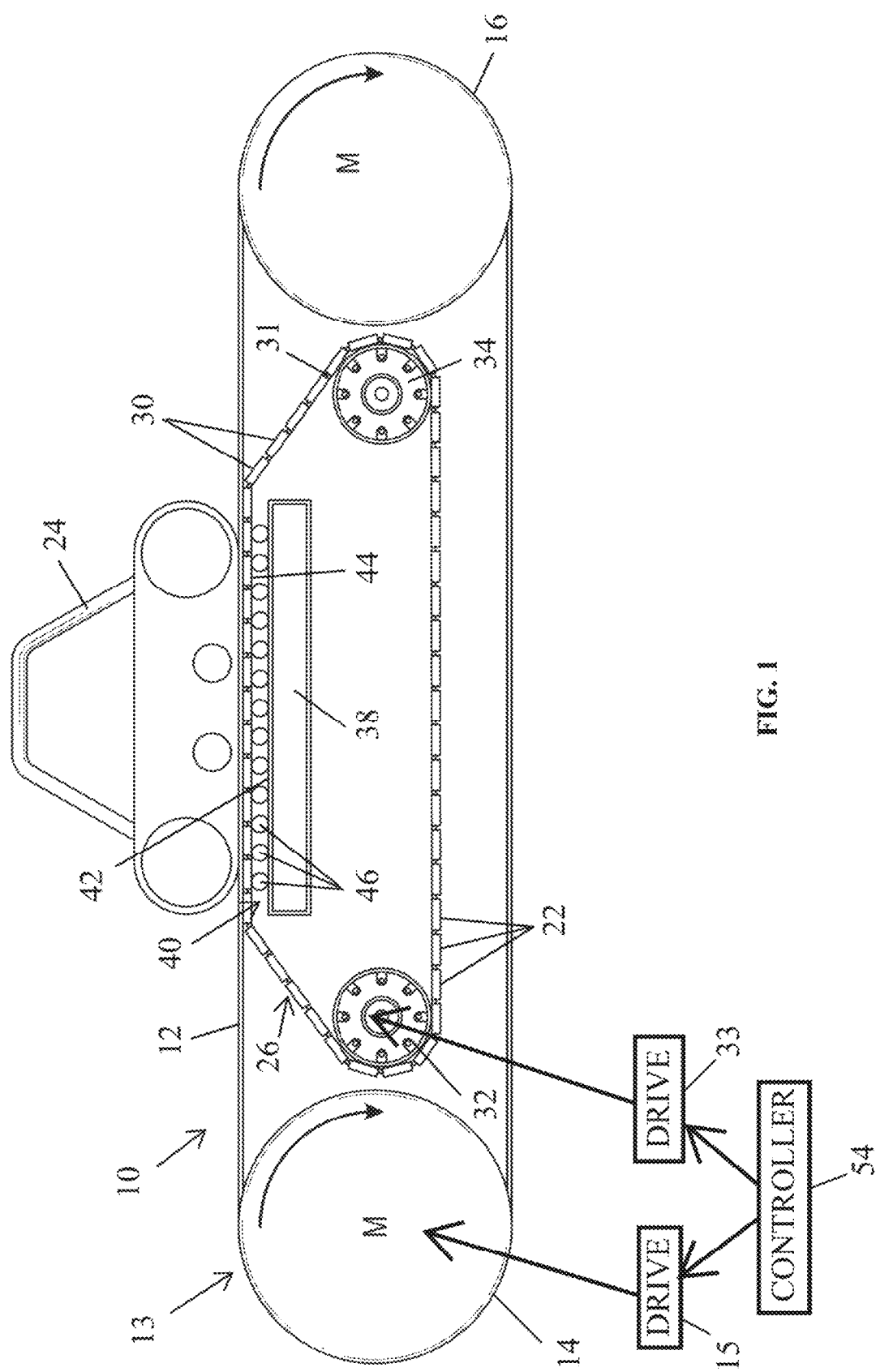
FIG. 1 is a schematic diagram of a testing machine.
Figure 2:
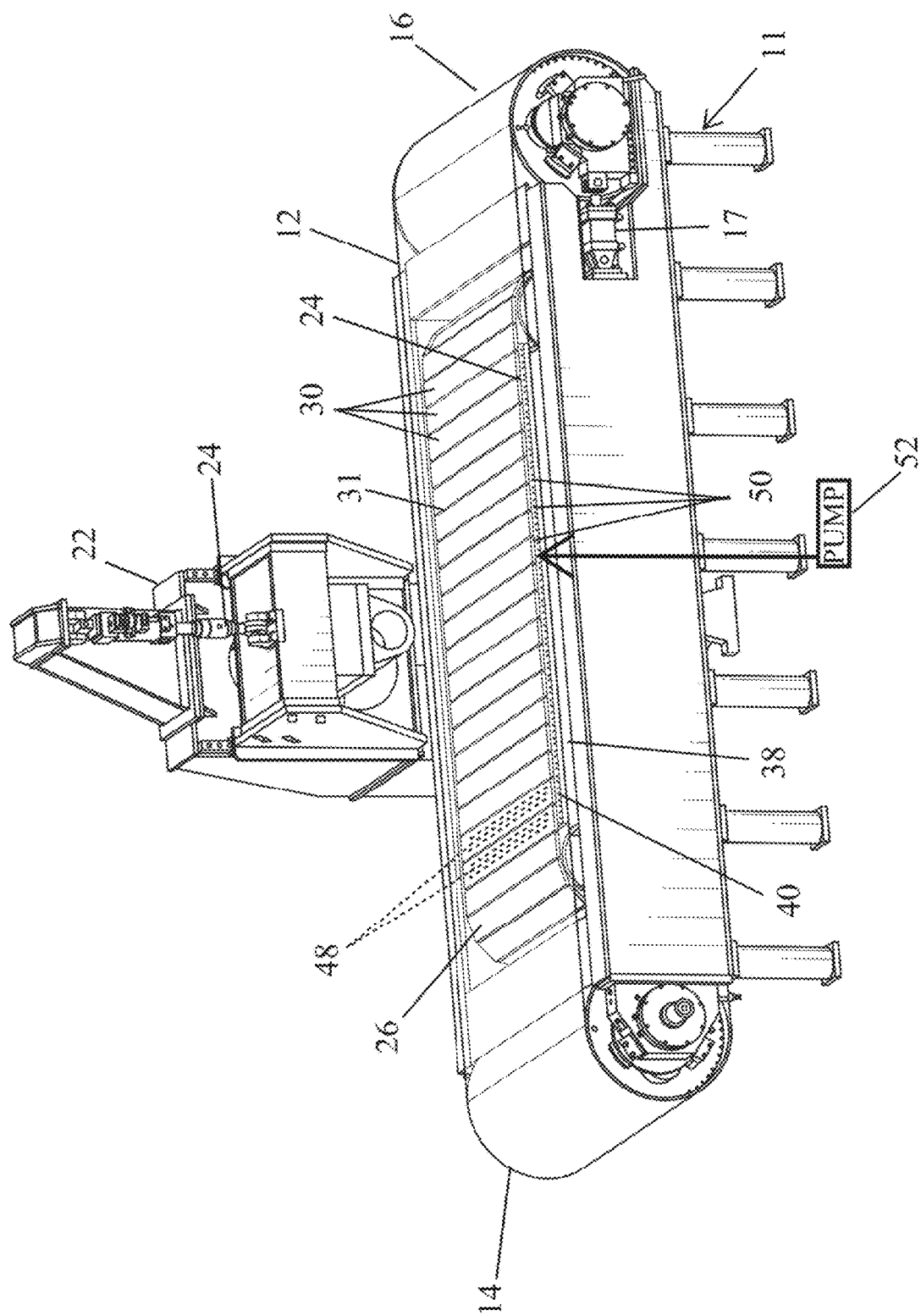
FIG. 2 is a perspective view of the testing machine.
Figure 3:
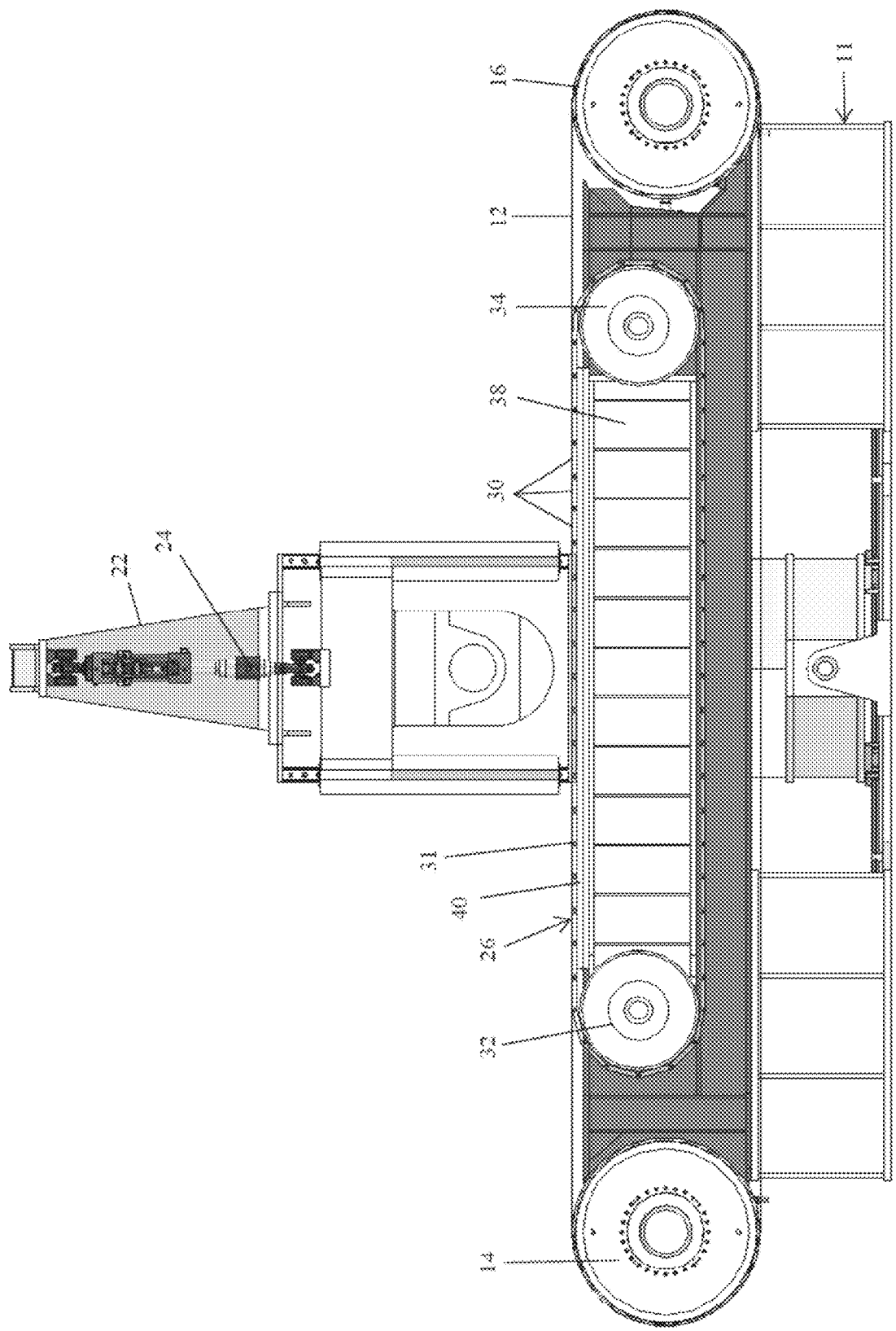
FIG. 3 is a front elevation view of the testing machine.

FIGS. 1-3 illustrate a testing machine 10 suitable for testing specimens that move at slower speeds than conventional tire and wheel assemblies on a vehicle and/or have a larger contact patch with the road surface than a conventional tire of a vehicle. The testing machine 10 includes a frame 11 and a movable roadway assembly 13 supported by the frame 11.

The roadway assembly 13 includes a first roller 14 and a second roller 16 that support an endless belt 12 for rotation on the rollers 14, 16. Commonly, the endless belt 12 is made of steel but can be made of any material suitable for the test to be conducted. Likewise, the endless belt 12 may be smooth or have a surface configured for the test specimen to be tested. Commonly, at least one of the rollers 14, 16 is driven by a suitable drive 15, which can be powered electrically or from hydraulic fluid or the like. An actuator 17 can be provided to vary the distance between the rotatable axes of the rollers 14, 16 such as to allow installation of the endless belt 12.

The testing machine 10 described herein is well suited for testing test specimens that have a larger contact patch than a typical tire and wheel assembly and/or rotate on the endless belt 12 at lower speeds than conventional tire and wheel assemblies. By way of example, FIG. 1 schematically illustrates a track assembly 20 used on vehicles such as tractors, skid steer loaders, tanks, etc. that comprises the test specimen. The track assembly 20 is mounted to a support structure 22 of the frame 11 so as to hold the track assembly 20 in position on the endless belt 12. Commonly, the support structure 22 includes various actuators, one of which is illustrated at 24, which by way of example provides a down force upon the track assembly 20. The support structure 22 can take numerous forms depending upon the test specimen being tested and is not pertinent to the testing machine 10 and as such will not be further described.

The test specimen 24 is supported on the endless belt 12 as it rotates by an endless support member 26. The endless support member is supported by the frame 11 and disposed between the first and second rollers 14, 16. The endless support member 26 engages the endless belt 12 from below and moves with the endless belt 12 at least for portions of the endless belt 12 that engages the test specimen 24 so as to configure the endless belt 12 as a flat surface. The endless support member 26 provides support to the endless belt 12 so as to react the forces presented by the large contact patch of the test specimen 24. The endless support member 26 also provides such support at lower linear speeds of the endless belt 12 than that of conventional flat belt testers, which as described in the Background, use a lubricating film and hydrodynamical principles to generate support of the endless belt via the lubricating fluid. At the slower speeds needed for testing test specimens such as the track assembly 20, the lubricating film and hydrodynamical principles would not provide the needed support.

Typically, the endless support member 26 includes rigid interconnected elements 30 such as support plates. The interconnected elements 30 can be connected together for instance by pivotable links or the elements 30 can be secured to an element support member 31 such as a belt or chain. A first rotatable member 32 and a second rotatable member 34 are provided so as to allow continuous rotation of the endless support member 26. The first and second rotatable members 32, 34 are configured to engage and drive from drive 33 the endless support member 26 which may depend upon the structure of the element support member 31 used to interconnect the elements 30. For instance, the first and second rotatable members 32, 34 can comprise drums each having a substantially cylindrical surface so as to frictionally engage and drive the element support member 31 if it comprises an endless belt. Likewise, the first and second rotatable members 32, 34 can comprise gears with teeth that engage apertures in the element support member 31, for example, when the element support member 31 comprises a chain. In FIGS. 2 and 3 the inclined portions of the endless support member 26 to the first and second rotatable members 32, 34 has been eliminated.

A stationary support 38 is typically disposed between the first and second rotatable members 32, 34 and reacts the loads generated by the test specimen 24 through the portions of the endless belt 12 and the endless support member 26 beneath the test specimen 24. A bearing 40 is commonly disposed between an upper surface 42 of the stationary support 38 and a lower surface 44 of the endless support member 26 as it rotates. The bearing 40 can take numerous forms. For instance, in FIG. 1, the bearing 40 comprises rotatable elements 46 such as rollers that contact the endless support member 26 from below wherein the rotatable elements 46 are supported for rotation by the stationary support 38 or frame 11. The rotatable elements 46 for instance can include rollers having a width and a longitudinal axis that is transverse to the linear motion of the endless support member 26 underneath the test specimen. The rotatable elements 46 can extend across the complete width of the endless support member 26 or only a portion thereof.

In the embodiment illustrated in FIG. 2, the bearing 40 is formed by pressurized fluid emitted from the stationary support 38 so as to contact and drive the portion of the endless support member 26 beneath the test specimen upwardly. The stationary support 38 can include apertures or outlets 48 through which the fluid is emitted. Suitable fluid conduits 50 are provided to each of the apertures 48 from a source of pressurized fluid 52, typically a pump. The fluid can comprise a gas such as air or a liquid if desired, the pump 52 being configured to pressurize the fluid depending upon whether it is a gas or liquid.

The endless support member 26 is driven so as to be synchronized with the speed of the endless belt 12 below the test specimen 24. In this manner, test specimen support is provided over the desired contact patch at the speed in which the test specimen is moving. However, since the endless support member 26 is moving with the endless belt 12 at the same linear speed of the endless belt 12 friction between the endless belt and the endless support member is substantially minimized or non-existent. Hence, the endless support member 26 provides support without generating unwanted forces upon the test specimen 24. The endless support member 26 can be driven by a suitable electrical or fluid drive. Speed sensors monitor the speed of the endless belt 12 and/or the endless support member 26 directly such as optically, or indirectly via rotation of the first and second rollers 14, 16 and/or first and second rotatable members 30, 32. A controller 54 receives inputs indicative of the speed of the endless belt 12 and endless support member 26 via the speed sensors and controls the drive for the endless support member 26 to match the speed of the endless belt 12.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A testing machine comprising:
   a frame; and
   a roadway assembly comprising:
      a first roller joined to the frame;
      a second roller joined to the frame;
      an endless belt supported by and rolling on the first roller and the second roller; and
      an endless support member supported by the frame and disposed between the first and second roller and engaging the endless belt from below, the endless support member moving with the endless belt;
      a first rotatable member and a second rotatable member, the endless support member being supported by the first rotatable member and the second rotatable member for rotation; and
      a rotatable drive motor operably coupled to the first rotatable member to rotate the first rotatable member, wherein frictional engagement of the first rotatable member drives the endless support member with rotation of the first rotatable member by the rotatable drive motor.

2. The testing machine of claim 1 and further comprising a stationary support disposed between the first roller and the second roller, the stationary support supporting the endless support member from below.

3. The testing machine of claim 2 and further comprising a bearing disposed between the stationary support and a surface of the endless support member facing the stationary support.

4. The testing machine of claim 3 wherein the bearing comprises a plurality of support rollers.

5. A testing machine comprising:
a frame; and
a roadway assembly comprising:
a first roller joined to the frame;
a second roller joined to the frame;
an endless belt supported by and rolling on the first roller and the second roller;
an endless support member supported by the frame and disposed between the first and second roller and engaging the endless belt from below, the endless support member moving with the endless belt;
a stationary support disposed between the first roller and the second roller, the stationary support supporting the endless support member from below; and
a bearing disposed between the stationary support and a surface of the endless support member facing the stationary support, wherein the bearing comprises a fluid disposed between the endless support member and the stationary support.

6. The testing machine of claim 5 and further comprising a source of pressurized fluid, wherein the stationary support comprises a plurality of outlets fluidly coupled to the source of pressurized fluid and configured to emit the fluid.

7. The testing machine of claim 6 wherein the fluid comprises a liquid.

8. The testing machine of claim 6 wherein the fluid comprises a gas.

9. The testing machine of claim 6 wherein the source of pressurized gas comprises a pump.

10. The testing machine of claim 8 wherein the source of pressurized gas comprises a pump.

11. The testing machine of claim 1 and further comprising a second drive operably coupled to the first roller to drive the first roller.

12. The testing machine of claim 1 and further comprising a controller operably coupled to the rotatable drive motor such that a velocity of the endless support member matches a velocity of the endless belt.

13. A testing machine comprising:
a frame; and
a roadway assembly comprising:
a first roller joined to the frame;
a second roller joined to the frame;
an endless belt supported by and rolling on the first roller and the second roller;
an endless support member supported by the frame and disposed between the first and second roller and providing support to the endless belt from below, wherein the endless support member comprises a plurality of interconnected elements directly facing a lower surface of the endless belt; and
a drive motor coupled to the endless support member configured to move independently from the endless belt.

14. The testing machine of claim 13 wherein the interconnected elements comprise interconnected plates.

15. The testing machine of claim 14 wherein the interconnected elements comprise interconnected plates, each plate extending in a direction transverse to a direction of movement of the endless belt.

16. A method of supporting a test specimen for rotation, comprising supporting the test specimen with an endless belt rotating below the test specimen; and
supporting the endless belt with an endless support member on a side of the endless belt opposite the side engaging the test specimen, wherein the endless support member is supported by a first rotatable member and a second rotatable member for rotation, and a rotatable drive motor is operably coupled to the first rotatable member to rotate the first rotatable member, wherein frictional engagement of the first rotatable member drives the endless support member with rotation of the first rotatable member by the rotatable drive motor; and
controlling the rotatable drive motor to rotate the first rotatable member so that a velocity of the endless support member below the test specimen matches a velocity of the endless belt below the test specimen.

17. The method of claim 16 wherein supporting the endless belt with the endless support member comprises a first roller joined to a frame and a second roller joined to the frame the endless belt supported by and rolling on the first roller and the second roller, and a drive coupled to the first roller, and the method further comprising driving the endless belt.

18. The method of claim 16 wherein the endless support member comprises a plurality of interconnected elements.

19. The testing machine of claim 5 wherein the endless support member comprises a plurality of interconnected elements.

20. The testing machine of claim 19 wherein the interconnected elements comprise interconnected plates.

21. The testing machine of claim 19 wherein the interconnected elements comprise interconnected plates, each plate extending in a direction transverse to a direction of movement of the endless belt.

* * * * *